July 14, 1970
R. S. McGAUGHEY
3,520,747
METHOD OF MAKING STRUCTURAL MEMBERS OF LAYERS OF CORROSION
RESISTANT COATINGS AND FIBROUS MATERIAL
Filed Oct. 29, 1965
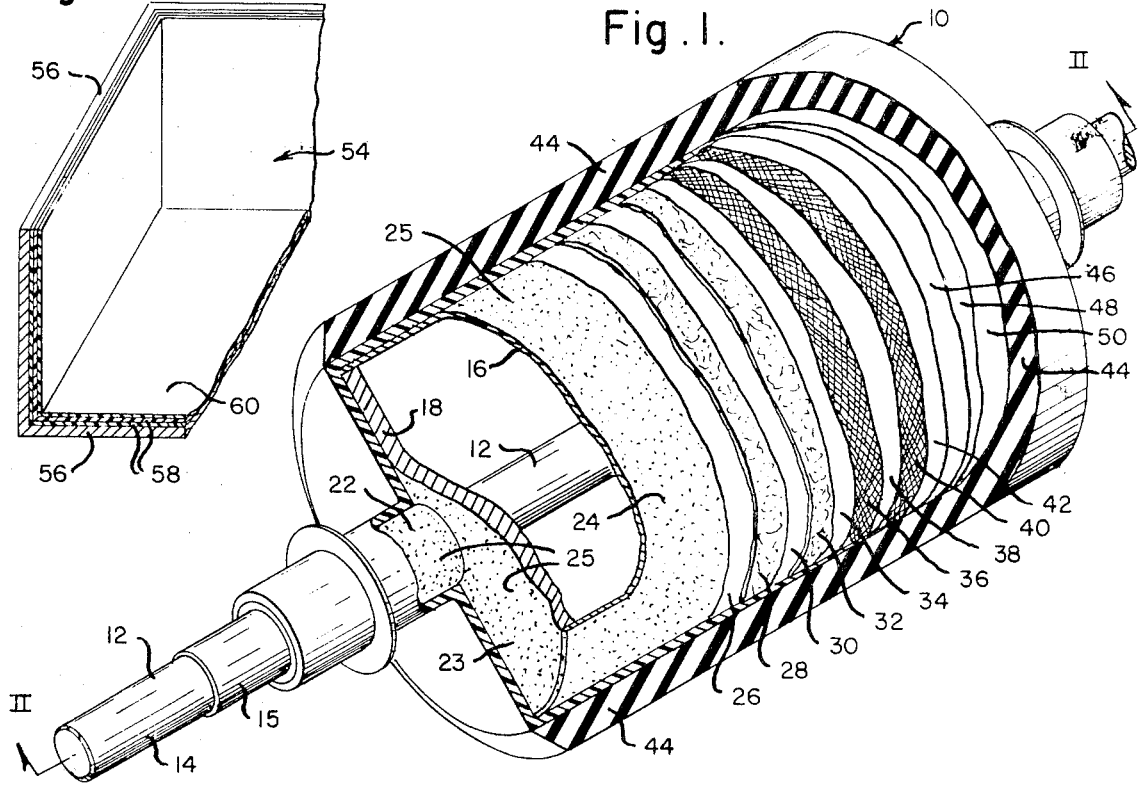
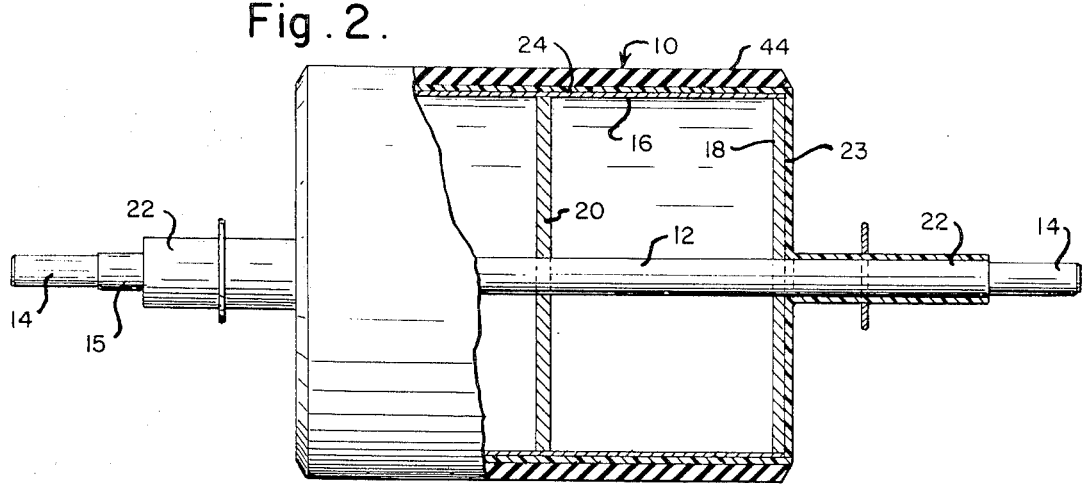
INVENTOR
Robert S. McGaughey
his Attorneys

United States Patent Office

3,520,747
Patented July 14, 1970

3,520,747
METHOD OF MAKING STRUCTURAL MEMBERS OF LAYERS OF CORROSION RESISTANT COATINGS AND FIBROUS MATERIAL
Robert S. McGaughey, Indiana, Pa., assignor to McCreary Tire & Rubber Company, Indiana, Pa., a corporation of Pennsylvania
Filed Oct. 29, 1965, Ser. No. 505,621
Int. Cl. B32b 27/12
U.S. Cl. 156—153                           20 Claims

ABSTRACT OF THE DISCLOSURE

I disclose a process for making a structural member for use in hydrofluoric and other corrosive environments, said structural member including a base structure, said process including the steps of roughening said base structure, applying a coating to said roughened surface of resin selected from the group consisting of polyester, phenolic and epoxy resins, depositing a layer of fiber glass material on said resin, coating an additional quantity of said resin on said fiber glass material, said additional resin being worked into the interstices of said fiber glass material to impregnate said fiber glass material as well as to leave a coating of said resin material thereover, applying a layer of fibrous material selected from the group consisting of crocidilite, asbestos, and fibrous polyvinyl chloride-acrylonitrile copolymer to said second-mentioned resin coating, applying a third quantity of said resin to the surface of said fibrous material, said third quantity of resin being worked into the interstices of said fibrous material to impregnate said material and to leave a coating of said resin thereover.

---

The present invention relates to composite structural materials or means and the like offering exceptional corrosion- and/or abrasion-resistance, and more particularly to materials of the character described having in addition means for structurally re-enforcing the base surfaces of such materials and to methods for fabricating the composite materials of the invention. The composite structural means can be arranged, pursuant to the invention, for use in a wide range of varying environmental conditions, typified by varying abrasive conditions, elevated temperatures, or any type of chemically corrosive conditions such as a relatively high or relatively low pH environment.

The invention finds extensive application in chemical processing equipment, such as for the construction of tanks, ducts, conveyors, weirs and the like for handling alkalis, acids and other corrosive materials, which may in addition contain abrasive matter or otherwise involve erosive flow velocities of the fluid, per se. Structural materials of the invention, for example, can be applied as one or more coatings, or as a laminant, to a substrate such as fan blades and ductwork used in a ventilating system for exhausting hot acid tanks or the like, or the composite materials can be used in the construction of, or as coatings on acid condensers or scrubbers coupled to the outlet of the ventilating system to prevent release of acid fumes to the atmosphere. The structural materials of the invention can be utilized moreover for coating or facing various rolls used in certain steel fabricating and other processes where the rolls are exposed to extremely corrosive environments as well as to the abrasive action of the moving steel material.

Although many attempts have been made to protect the base materials (usually steel or steel alloys) of the aforementioned and other equipment from the aforementioned corrosive or abrasive environments or both, expedients such as glass, plastic and rubber coatings or linings have largely proven to be unsatisfactory.

In steel mill appliactions, for example in handling steel strip and the like, large numbers of the aforementioned rolls are utilized for guiding, tensioning, and otherwise engaging the strip during rolling and pickling operations. During the strip handling operations such rolls are subjected to the various strong pickling agents and other corrosive compounds employed in pickling or cleaning or in otherwise treating the steel strip for various applications. These strong cleaning agents are unavoidably carried to and coated on the various handling rolls as the strip is moved thereover or therebetween as it proceeds along the length of the rolling mill, pickling line or the like.

The roll body is usually fabricated from a structural material such as carbon steel, which can be hollow as noted below, and in order to protect the rolls from attack by the aforementioned cleaning or pickling agents, such as hydrochloric, sulfuric, and hydrofluoric acids, it is customary to provide an acid-resistant covering for the roll, such as neoprene acid-resistant rubber or other elastomeric material. The rubber covering also affords increased frictional engagement between the roll and the work material. Although the application of the neoprene coating initially functions satisfactorily for the purpose intended, the roll when thus coated, unavoidably undergoes minor damage to its neoprene coating resulting in rupture thereof and providing access of acid to the steel core of the roll. The steel core is then eaten away by the acid and is consequently damaged beyond repair usually before the coating damage is discovered owing to the fact that small ruptures in the neoprene coating are not readily apparent. Although the neoprene covering can be removed and replaced by a new neoprene covering as required, usually, however, restoration of the strip handling rolls in this manner is not done as long as such ruptures are not obvious and the neoprene covering is adequately performing its function of providing the proper frictional engagement of the rolls with the steel strip.

Because no great force is applied to such strip handling rolls, even in those applications where a pair of such rolls are employed for pinch rolls or the like, it is the usual practice to utilize a hollow steel core for the rolls in order to reduce the weight and expense thereof. In order to minimize the thickness of the steel shell or core of the roll it is desirable to provide a tough, hard, abrasion resistant coating upon the steel shell in order to reinforce the latter and to minimize surface wear. Such coating, when applied to the strip handling roll in accordance with the invention, affords a suitable base surface for the application for one or more subsequently applied protective coverings, also provided by the invention, or alternatively, the last-mentioned protective coatings of the novel strip handling roll or the like can be provided directly upon the steel base or other core material of the roll, as pointed out in greater detail hereinafter.

Accordingly, the novel, corrosion-resistant roll, or other composite structural member, as disclosed herein, includes a core or substrate made of steel or other structural material core or substrate which, after suitable surface treatment, can be reinforced, with a corrosion resistant resin material such as a reinforced polyester, phenolic, or epoxy resin, depending upon the application thereof, which is in turn reinforced with a mat or cloth of fibrous material such as fiber glass, polyvinyl type fibers such as Dynel (polyvinyl chloride acrylontrile copolymer) Orlon (polyacrylonitrile), polyester fiber such as Dacron (commonly designating terephthalate compounds, a specific example of which is the product made by the condensation of dimethyl terephthalate and ethylene glycol), polyamide fiber such as nylon, (polyhexamethylene adipamide), or naturally occurring fibers such as asbestos and crocidilite (blue asbestos). As used herein, the term "mat" when employed alone is inclusive of cloth. The particular fiber and resin selected will depend upon the corrosive material or materials encountered. For example, in strong acid environments such as sulfuric or hydrochloric, a resin such as polyester, re-inforced with fiber glass can be employed. For other acid environments, such as hydrofluoric which readily attacks glass, a resin such as polyester, reinforced with Dynel cloth, or other polyvinyl copolymer fiber, or with a mineral fiber such as crocidilite, can be employed.

In steel strip handling operations, however, where hydrofluoric and other acids are encountered, the last-mentioned protective Dynel or crocidilite covering can be provided for the roll either upon the aforementioned fiber glass or other fiber reinforcement or directly upon the exposed or base core structure of the roll. The same can be applied to chemical processing equipment as tank linings or the like. The latter protective equipment can include, for an example, a corrosion-resistant resin layer reinforced by Dynel cloth, which when thus applied, affords complete corrosion-resistance to the roll, including immunity to attack by hydrofluoric acid and other acids, and moreover, offers superior abrasion resistance in comparison to that provided by the aforementioned impregnated fiber glass when used.

Depending upon the application of the invention, a resilient covering is adhered to the reinforced resin coating to enhance the abrasion or erosion resistance thereof. In the case of the aforementioned roll, when the roll is to be used in steel strip handling operations, the resilient covering promotes the frictional engagement thereof with the steel strip.

The resilient material can be a material selected from the group consisting of elastomeric materials such as polyurethane, silicone, neoprene, natural rubber, Hypolon (chlorosulfonated polyethylene rubber), butyl (including chlorobutyl and bromobutyl), Thiokol (copolymer of ethylene-propylene-cyclopentadiene), and butadiene (including SBR, nitrile, and acrylonitrile) rubbers. The particular elastomer selected will depend upon the environment to which the structural material of the invention will be subjected and the selection will hinge primarily upon the factors of abrasion, friction, pH, and temperature. When, for example the structural material is used in connection with the aforementioned steel strip handling roll an acid-resistant neoprene can be used.

In those applications where, for example, hydrofluoric acid is not encountered, one of the aforementioned elastomers can be applied directly upon the reinforced plastic covering containing any of the aforementioned fibers or equivalent. Where the utmost reinforcement is not required, a single Dynel or blue asbestos layer can be applied directly to the core structure of the roll, followed by application of the acid-resistant neoprene covering, for use in the hydrofluoric acid environment. Where the composite structural material of the invention is to be employed to maximum advantage, i.e., the combined features of structural and surface reinforcement, optimum abrasion resistance, and optimum acid resistance, a laminant of the aforementioned coverings can be employed, with a multi-layered resin covering reinforced for example, with fiberglass being first applied, followed by one or more resin layers reinforced with Dynel or crocidilite fiber and then the acid-resistant neoprene covering in succession. Specific details for the application of the aforementioned coverings for rolls and for use with other reinforced and corrosion-resistant structures will be set forth hereinafter.

These and other objects, features, and advantages of the invention, together with structural details thereof, will be elaborated upon during the forthcoming description of certain presently preferred embodiments of the invention, together with presently preferred methods of practicing the same.

In the acompanying drawings, there are shown certain presently preferred embodiments of the invention together with presently preferred methods of practicing the same, wherein:

FIG. 1 is an isometric view of one form of roll structure arranged to utilize the composite abrasion- and corrosion-resistant structure of the invention, with portions thereof being cut away in order to show the invention more clearly;

FIG. 2 is a longitudinally sectioned view of the roll structure of FIG. 1, taken generally along reference line II—II thereof; and FIG. 3 is a partial, isometric view of another form of the composite structure of the invention, used here in connection with chemical processing equipment such as a tank for use with highly abrasive and corrosive materials.

Referring now more particularly to FIGS. 1 and 2 of the drawings, the exemplary form of the invention illustrated therein includes a roll 10 having a number of reinforcing and protective coverings thereon. In this arrangement the roll 10 includes a shaft 12 extending therethrough, as better shown in FIG. 2, and journaled at each end as denoted by the reference characters 14 for mounting in suitable bearings therefor, (not shown) of equipment for supporting and rotating the roll 10.

An additional journaled portion 15 is provided adjacent one of the bearing journals 14 for mounting a drive pulley, sprocket, or the like for rotating the roll 10. In this example, the core structure of the roll 10 includes a hollow tubular member 16, preferably of right cylindrical configuration, supported at its ends by appropriately shaped annular discs 18 which in turn are secured to the shaft 12 and to the respective ends of the tubular member 16, as by welding. Desirably, the core structure thus far described is reinforced by one or more additional annular discs 20 of similar shape, with one such disc 20 being shown in FIG. 2 and secured to the shaft 12 and to the mid-circumferential region of the cylinder 16.

Before the application of the coatings or coverings presently to be described, the roll journals 14 and 15 are protected from damage by wrapping with masking or friction tape (not shown), and the remaining portions of the roll 10, including the exposed shaft portions or shanks 22, the end faces or end disc outer surfaces 23 of the roll, and the cylindrical work surface 24 thereof are treated to afford proper adhesion of the initial covering thereto. In this example, the aforementioned surfaces are first wiped with a suitable solvent such as chlorothane to remove any residual deposits of grease and oil. Following degreasing in this fashion, the portions of the roll 10 to be coated are then sand- or grit-blasted or otherwise treated with a suitable abrasive process to remove all traces of rust and corrosion from these surfaces and to roughen the surfaces as denoted by reference character 25 (FIG. 1), in order to enhance coating adhesion thereto. If the roll 10 when thus treated must be permitted to stand for a period of time following grit-blasting or the like and before application of the initial covering, the sand blasted or otherwise roughened surfaces 25 should be washed with acetone before proceeding to the first coating application.

Following the roughening operation, an initial, corrosion-resistant resin coating 26 is applied to the sand blasted surfaces as by painting or spraying. As noted above, a polyester, phenolic or epoxy resin is suitably utilized for this purpose. Prior to the resin application, a polyester, phenolic or epoxy primer coating, respectively, of a known slow-curing variety, can be applied, depending upon the particular type of the aforementioned resins which is used. For optimum resistance to acids including hydrofluoric, a polyester resin such as that sold under the trademark Hetron 197—Hooker Chemical, N. Tonawanda, N.Y. is desirable and can be applied over the aforementioned polyester primer coating. The primer coat can be omitted where the roll or other base member is coated immediately after grit-blasting. The polyester, epoxy, or phenolic resin desirably is activated in the conventional manner for either air or heat curing. Such resins are supplied conventionally for these purposes as two-part systems including the respective activators. Frequently, however, polyester resins are supplied with an air-curing activator, while the epoxy and phenolic resins are activated for heat-curing.

Before the resin coating has hardened, a layer of one of the aforementioned fibrous reinforcing materials is placed over the freshly applied resin. The thickness and character of the fibrous material, which in this example is fiber glass, can be varied depending upon the application of the invention and the required degree of toughness and surface reinforcement to be imparted to the roll 10. In this example of the invention, a mat 28 of chopped fiber glass is employed, with a weight of about 1½ ounces per square foot of mat. The mat is applied to the work and end surfaces 23, 24 of the roll and to the exposed shanks 22 of the shaft 12. At the junctions between portions or discrete segments of the aforementioned mat, a one to two inch overlap desirably is provided to prevent loss of reinforcement in these areas. Depending upon the strength or amount of reinforcement desired, and upon the number of layers or laminations fiber glass mat weighing between ¾ ounce and 10 ounces per square foot can be used.

A second quantity of the aforementioned corrosion-resistant resin is then applied to the fiber glass mat and, while still fluid, is thoroughly worked into and over the mat to wet completely the fibers thereof, to remove any traces of air bubbles therefrom, and to leave a coating 30 of resin thereon. A second layer 32 of one of the aforesaid fibrous reinforcing materials is immediately applied to the second resin coating 30. The weight and configuration of the fibrous material, which can also be fiber glass in this example, in the second layer 32 thereof likewise can be varied depending upon the application of the invention. In this example, a thinner mat of chopped fiber glass is employed, with a weight of about ¾ ounce per square foot, and is applied to the second resin coating 30 in the manner set forth above in connection with the initial fiber glass layer 28. The weight of the mat 32 can also be varied between ¾ ounce and 10 ounces as noted above with reference to the fiber glass mat 28.

Following this application, a third coating 34 of corrosion-resistant material, or resin such as that noted above, is applied to the fiber glass layer 32 and worked into the interstices thereof and coated thereover as described previously. While the resin coating 34 is still fluid, a third layer 36 of one of the aforementioned fibrous reenforcing materials for example, a fiber glass material, if additional reinforcement is required, is then applied while the resin coating 34 is still fluid. The fiber glass material 36 can be applied as described above, either in connection with the first fiber glass layer 28 or the second layer 32 thereof, or as utilized in this example, the fiber glass material can be applied as a woven fiber glass cloth weighing about 6 ounces per square yard. The fiber glass cloth 36 is then impregnated with a succeeding layer 38 of corrosion-resistant resin in the manner described in connection with the resin coatings 30 and 34, in order to reinforce the associated plastic layer including the resin coatings 34–38. It is contemplated, of course, that the fiber glass will be provided with a suitable, conventional fiber surface finish selected for compatability for use with the selected one of the aforementioned resins.

The arrangement described thus far completes the reinforcement covering for the steel core 16–18 of the roll 10. It is to be understood, of course, that a greater or lesser number of reinforced plastic layers including the aforementioned associated resin coatings can be employed in place of that shown in the drawings. It is also contemplated that a lesser number of reinforced plastic layers can be applied to the steel end discs 18 and to the shaft shanks 22 than to the work surface 24 of the roll 10, as represented by the cylinder 16. Depending upon the application of the invention and upon the particular corrosive environment in which the roll 10 or other composite structure, arranged in accord with the invention, is to be used one or more of the aforementioned fibrous materials can be substituted for fiber glass.

For example, in those applications wherein the roll 10 or other structure is exposed to corrosive materials which may attack glass or certain others of the fibrous materials such as hydrofluoric acid, a layer of Dynel cloth or a crocidilite fiber can be substituted for one or more of the outermost layers of the fiber glass material mentioned above, or alternatively all of the fiber glass material can be omitted and one or more layers of the Dynel cloth or crocidilite fiber can be substituted therefor. In the latter case, the Dynel fiber or crocidilite fiber can be applied directly to the initial resin coating 26.

In the present example, however, a layer of Dynel cloth 40 is applied to the lost resin coating 38, before the latter has completely set up. Following this application a final coating 42 of the aforementioned resin is applied to the Dynel cloth covering 40 and worked into the interstices thereof and coated thereover in the manner described above in connection with the coverings of fiber glass material. As better shown in FIG. 2, the final reinforced plastic layer including the Dynel fiber 40 and the overlying resin coating 42 covers all exposed surfaces of the roll 10 including the work surface 24, the end faces 23, and the shanks 22. Thus, all exposed surfaces of the roll 10 are completely protected from attack by hydrofluoric acid or any other corrosive material. In those applications of the invention wherein the roll 10 or other structural member can be utilized without a frictional or yieldable work surface or where abrasional conditions are not severe, the roll 10 or other structural member can be utilized as coated in accordance with the description thus far set forth, after machining or turning to ensure symmetry about its rotational axis.

However, in applications, such as in steel strip rolling or pickling lines, where a pair of rolls 10 are used as pinch rolls or where otherwise the roll must yieldably or frictionally engage the material, a final layer of one of the aforementioned elastomers or other suitably resilient plastic is applied to the work surfaces of the roll 10, as better shown in FIG. 2. In order to afford an additional measure of corrosion-resistance, the covering 44 can be formed from neoprene acid-resistant rubber. However, as seen from FIG. 2, it is not necessary to apply the yieldable covering 44 to the end faces 23 of the roll 10 or to the shanks 22, as the end faces and shanks are adequately protected by the previously described reinforced plastic coverings on these areas.

The resilient covering 44 can be applied as follows: After the last resin coating 42 has hardened, the surface thereof in the area where the resilient covering 44 is to be applied for example the roll work surface 24 is washed with acetone. After the acetone has dried, the reinforced resin layer 40–42 is grit-blasted to an extent preferably to expose some of the reinforcing fiber 40. Then the composite structure is subjected to a rough sanding to improve the regularity of the coating surface, or in the case of the roll 10, is rough-machined or turned to ensure symmetry, as pointed out above. Certain of the aforementioned elastomers, for example, polyurethane rubber, will then bond securely to any of the aforesaid resins (polyester, phenolic, or epoxy) without further surface treatment of the reinforced resin layer. This bonding is made more secure by adherence to the exposed reinforced fiber. On the other hand, neoprene rubber can be bonded to the thus prepared resin surface, for example, by first coating with a solution of neoprene rubber in toluol. Natural, nitrite, or silicone rubber can be adhered by first applying a similarly suitable elastomeric material dissolved in a suitable solvent, to the roughened surface of the final, reinforced plastic layer 40–42.

In the latter case, a first coat of a suitable primer material 46 is applied to the reinforced resin laminant. The solvent in the primer may soften the resin material 42 on the surface of the last reinforced plastic covering. It has been found, however, that when the primer coat 46 is permitted to dry for a period of approximately four hours, that the surface of the roll 10 or other composite structure, when thus treated, again becomes very hard and tough. A second coating 48 of the primer followed by a layer of a suitable cement material 50 that is then applied.

The cement coat 50 and at least the second one of the primer coats 46, 48 are confined to the work surface 24 of the roll 10 as is the resilient layer 44. For the reason pointed out below, it is desirable in certain applications to apply the first primer coat 46 to the entire portion of the last resin coating 42.

The first primer coat 46 protects the last resin layer 42 from further softening action by the solvents of the subsequently applied primer coat 48 and the cement coat 50 such that no further softening thereof occurs during the applications of the second primer coat 48 or the cement coat 50. Therefore, in those applications wherein the roll 10 or other composite structure of the invention is to be utilized without a resilient covering 44, and where the roll as other composite structures may be exposed to the aforementioned solvents in addition to the aforementioned acid or other corrosive materials, at least one of the primer coats 46, 48 desirably is applied to the entire surface of the last resin layer 42 as a final coating.

In the case of the roll 10, after the covering 44 of resilient material, such as the aforementioned acid-resistant neoprene, is applied in a conventional manner, thereto the roll 10 is then wrapped with cotton webbing (not shown) and placed for curing of the rubber in steam autoclave or other suitable oven, both of conventional construction. After curing, the roll 10 is removed therefrom, unwrapped, and ground in a conventional roll-grinding machine (not shown) in order to ensure that the relatively thick resilient covering 44 is symmetrical about the rotational axis of the roll 10.

In order to prevent exposure of the roll end faces 23 and shanks 22 to the steam atmosphere during an autoclave curing operation, the roll faces and shank portions of the roll 10 can be covered with a relatively thin layer of neoprene material to prevent contact of the otherwise exposed reinforced plastic coatings on these areas of the roll by superheated steam, which otherwise would tend to delaminate the aforementioned coatings. Alternatively, the reinforced plastic covering can be applied separately to the end faces 23 and shank areas 22 after application of the coatings 26–50 to the work surface 24 of the roll 10 and after removal thereof from the aforementioned autoclave, when used.

Referring now to FIG. 3 of the drawings the composite abrasion-and corrosion-resistant structure of the invention is utilized in the construction of chemical processing equipment such as a tank 54 having in this example metallic side and bottom walls 56, which form the metallic substrate of the composite structure. One or more reinforced plastic layers 58 are coated upon the substrate or tank walls 56, which desirably are first roughened as described upon in connection with the roll 10 of FIGS. 1 and 2. Upon the innermost one of the plastic layers 58, a surface covering 60 of one of the aforementioned elastomers or other resilient plastic material is adhered. The materials for the elastomer coating 60 and the reinforced plastic coatings 58 can be selected from those set forth above, as determined by the application of the invention. For example, for strong mineral acids, such as hydrochloric, sulfuric, or phosphoric, containing abrasive material the elastomer can be Hypolon or neoprene while a polyester resin reinforced with Dynel or fiber glass fiber can be employed. On the other hand, a strong alkali and abrasive mixture would necessitate an elastomer such as neoprene or butyl, or Hypolon and a reinforced plastic such as epoxy resin with fiber glass or Orlon fiber embedded therein. For use in the oil or grease environment, a nitrile rubber can be utilized as the elastomeric covering on any of the aforementioned reinforced plastic coatings. Where abrasion resistance of the final or resilient coating is paramount, a butadiene rubber desirably is employed as the elastomeric covering. Natural rubber desirably is employed in those applications where frictional heat is developed, as the final or resilient layer of the composite structure owing to the lower hysteresis properties of natural rubber. The aforementioned coverings 58–60 can be adhered to the tank walls 56 and successively to one another by the process as set forth above in connection with the roll 10 and FIGS. 1 and 2. Although a reinforced plastic laminant comprising two such coatings 58 has been illustrated, it is contemplated that a lesser or greater number thereof can be employed depending upon the application of the invention and attendant environmental conditions. Obviously, the foregoing examples are applicable to the aforedescribed roll and other equipment mentioned herein and their equivalents, depending upon the environmental applications thereof.

The process of reinforcing the aforementioned resin coatings with fibrous material is capable of many variations. For example, the fibrous material is available in strips preimpregnated with a given resin in a "tacky" or semi-cured condition, with such material being known as "prepregs". In the case of the roll structure described, the prepreg is wrapped therearound one or more times depending upon the number of reinforced layers desired and "bagmolded" under heat and pressure to fuse the layer or layers together or to preceding layers. For this purpose the enclosing bag is evacuated in accord with known techniques.

The reinforced coating can also be applied as a spray lay-up. The desired resin is sprayed in an uncured or fluid condition from suitable spray apparatus onto the substrate, and the desired reinforcing fibre is introduced into the resin spray-fan, where it is admixed with the resin and carried thereby to the substrate. The fibre for this purpose is chopped into short lengths from roving, which is available in various types of fibres and blown into the resin spray-fan. In an exemplary arrangement the fibre blower is mounted between two resin spray nozzles, all of which are directed toward the work.

I claim:

1. A process for making a structural member for use in hydrofluoric and other corrosive environments, said structural member including a base structure, said process including the steps of roughening said base structure, applying a coating to said roughened surface of resin selected from the group consisting of polyester, phenolic and epoxy resins, depositing a layer of fiber glass material on said resin, coating an additional quantity of said resin on said fiber glass material, working said additional resin into and over the interstices of said fiber glass material to impregnate said fiber glass material as well as to leave a coating of said resin material thereover, applying a layer of a fibrous material selected from the group consisting of crocidilate, asbestos, and fibrous polyvinyl chloride-acrylonitrile copolymer to said second-mentioned resin coating, applying a third quantity of said resin to the surface of said fibrous material, working said third quantity of resin into and over the interstices of said fibrous material to impregnate said material and to leave a coating of said resin thereover.

2. A process for making a roll for use in hydrofluoric and other corrosive environments, said roll including a core structure, said process including the steps of roughening said core structure, applying a coating to said roughened surface of resin selected from the group consisting of polyester, phenolic and epoxy resins, depositing a layer of fiber glass material on said resin, coating an additional quantity of said resin on said fiber glass material, working said additional resin into and over the interstices of said fiber glass material to impregnate said fiber glass material as well as to leave a coating of said resin material thereover, applying a layer of a fibrous material selected from the group consisting of crocidilite, asbestos, and fibrous polyvinyl chloride-acrylonitrile copolymer to said second-mentioned resin coating, applying a third quantity of said resin to the surfaces of said fibrous material, working said third quantity of resin into and over the interstices of said fibrous material to impregnate said material and to leave a coating of said resin thereover, coating the surface of said last-mentioned resin material with a primer material, and drying said primer material for a period of about four hours to permit said last-mentioned resin coating to reharden.

3. A process for making a roll for use in hydrofluoric and other corrosive environments, said roll including a core structure, said process including the steps of roughening said roll, applying a coating to said roughened surface of resin selected from the group consisting of polyester, phenolic and epoxy resins, depositing a layer of fiber glass material on said resin, coating an additional quantity of said resin on said fiber glass material, working said additional resin into and over the interstices of said fiber glass material to impregnate said fiber glass material as well as to leave a coating of said resin material thereover, applying a layer of a fibrous material selected from the group consisting of crocidilite, asbestos, and fibrous polyvinyl chloride-acrylonitrile copolymer to said second-mentioned resin coating, applying a third quantity of said resin to the surface of said fibrous material, working said third quantity of resin into and over the interstices of said fibrous material to impregnate said material and to leave a coating of said resin thereover, coating the surface of said last-mentioned resin material with a primer material, drying said primer coating for a period of about four hours to permit said last-mentioned resin coating to reharden, coating said primer coat after said last-mentioned resin has rehardened with a second quantity of said primer, applying a coating of a cement material thereover when dried, and adhering a layer of corrosion-resistant neoprene to said cement coating.

4. A process for making a roll for use in hydrofluoric and other corrosive environments, said roll including a core structure, said process including the steps of roughening said core structure, applying a coating to said roughened surface of resin selected from the group consisting of polyester, phenolic and epoxy resins, depositing a layer of fiber glass material on said resin, coating an additional quantity of said resin on said fiber glass material, working said additional resin into and over the interstices of said fiber glass material to impregnate said fiber glass material as well as to leave a coating of said resin material thereover, applying a layer of a fibrous material selected from the group consisting of crocidilite, asbestos, and fibrous polyvinyl chloride-acrylonitrile copolymer to said second-mentioned resin coating, applying a third quantity of said resin to the surface of said fibrous material, working said third quantity of resin into and over the interstices of said fibrous material to impregnate said material and to leave a coating of said resin thereover, and securing a relatively thick layer of corrosion-resistant elastomeric material to said last-mentioned resin coating.

5. The process according to claim 1 characterized in that the second and third steps thereof are repeated in alternation.

6. In a process for covering a roll for use in a hydrofluoric and other corrosive environments, said roll including a generally cylindrical core structure and a shaft extending axially therethrough, said process including the steps of roughening the exposed surfaces of said shaft and of said core structure including the cylindrical work surface and the annular end faces thereof, applying a coating on said shaft portions and said end faces and said work surfaces of resin selected from the group consisting of polyester, phenolic and epoxy resins, applying a layer of fiber glass material to said resin coating in co-extension therewith, impregnating and coating said fiber glass material with an additional quantity of said resin material, applying a layer of a fibrous material selected from the group consisting of crocidilite, asbestos, and fibrous polyvinyl chloride-acrylonitrile copolymer to said second resin coating in coextension therewith, impregnating and coating said fibrous material with a third quantity of said resin, and adhering a layer of corrosion-resistant elastomeric material to said last-mentioned resin coating, said elastomeric layer being coextensive only with the cylindrical work surface of said roll.

7. The process according to claim 6 including the additional step of coating said exposed shaft surfaces and said core structure end faces with a protective covering impervious to steam, providing acid-resistant neoprene as said elastomeric material, and curing said roll including said neoprene with steam.

8. A process for protecting a roll for use in a hydrofluoric and other environments, said roll including a cylindrical core structure having annular end faces and a cylindrical work surface with a shaft therefor protruding axially therethrough, said process including the steps of roughening the exposed surfaces of said shaft and said end faces and said work surface, applying a coating to said work surface of resin selected from the group consisting of polyester, phenolic and epoxy resins, applying a layer of fiber glass material to said resin, impregnating and coating said fiber glass material with a second quantity of said resin, applying a layer of a fibrous material selected from the group consisting of crocidilite, asbestos, and fibrous polyvinyl chloride-acrylonitrile copolymer to said second resin coating, impregnating and coating said fibrous material with a third quantity of said resin, adhering a layer of acid-resistant neoprene to said third resin coating, treating said roll with superheated steam to cure said neoprene layer, and similarly applying successive coatings of, said fiber glass material, said resin, said fibrous material and said resin to said shaft surfaces and to said end faces after said curing step to prevent contact of exposed resin coating on said shaft surfaces and said end faces by said steam.

9. The process according to claim 4 including the additional steps of wrapping said roll with cotton webbing, and curing said roll with steam.

10. The process according to claim 9 including the additional steps of rotating said roll after unwrapping said webbing about its longitudinal axis, and grinding the elastomeric layer thereof in order to ensure symmetry about said axis.

11. A process for making a composite abrasion- and corrosion-resistant member including a base member, said process comprising the steps of roughening the surface of said base member, applying a coating to said roughened surface of resin selected from the group consisting of polyester, phenolic and epoxy resins, depositing a substantially coextensive layer of reinforcing fibrous material upon said resin, coating an additional quantity of said resin on said fibrous material, working said additional resin into and over the interstices of said fibrous material to adhere said fibrous material to the previous coating of said resin and to impregnate thoroughly said fibrous material by wetting the fibers thereof and removing air bubbles therefrom, as well as to leave a coating of said resin thereover, repeating said coating and depositing and working steps to form a rigid resin structure, roughening the surface of said last-mentioned resin coating to expose individual fibers of said fibrous material, and adhering a layer of an elastomeric material to said roughened resin coating, whereby the exposed fibers become embedded in the elastomeric material to aid in adhering the same.

12. The process according to claim 11 including the additional steps of applying successive layers of resin and fibrous material to the base member to produce a reinforced plastic laminant to which said elastomeric layer is adhered.

13. The process according to claim 11 including the additional step of selecting said fibrous material from the group consisting of fiber glass and fibers of polyvinyl chloride copolymer, acrylonitrile polyester, polyamide, asbestos, and crocidilite, and selecting said elastomeric material from the group consisting of silicone, polyurethane, neoprene, chlorosulfonated polyethylene, butyl ethylene - propylene - cyclopentadiene copolymer, butadiene, and natural rubbers.

14. The process according to claim 11 including the additional step of coating a solution of neoprene rubber in toluol on the roughened surface of said additional resin prior to the application of a layer of neoprene rubber as said elastomeric material.

15. The process according to claim 11 including the additional step of washing said last-mentioned resin coating with acetone before the second-mentioned roughening step.

16. The process according to claim 18 including the additional step of applying a primer coat comprising a portion of said elastomeric material dissolved in a suitable solvent prior to said adhering step.

17. The process according to claim 1 including the modified step of depositing said fiber glass layer to the extent of between ¾ ounce and 10 ounces per square foot.

18. The process according to claim 5 including the modified step of depositing a first layer of fiber glass to the extent of about 1½ ounces per square foot, depositing a second layer of fiber glass to the extent of about ¾ ounce per square foot and depositing a third layer of fiber glass to the extent of about 6 ounces per square yard.

19. The method according to claim 11 including the additional steps of washing said base member with chlorothane prior to the first-mentioned roughening step, and washing said roughened base member surface with acetone following said first-mentioned roughening step.

20. A process for making a composite abrasion- and corrosion-resistant member including a base member, said process comprising the steps of applying a coating to said base member of a resin selected from the group consisting of polyester, phenolic and epoxy resins, depositing a substantially coextensive layer of reinforcing fibrous material upon said resin, coating an additional quantity of said resin on said fibrous material, working said additional resin into and over the interstices of said fibrous material to adhere said fibrous material to the previous coating of said resin and to impregnate thoroughly said fibrous material by wetting the fibers thereof and removing air bubbles therefrom, as well as to leave a coating of said resin thereover, repeating said coating and depositing and working steps to form a rigid resin structure, and adhering a layer of an elastomeric material to said rigid structure.

References Cited

UNITED STATES PATENTS

| | | | |
|---|---|---|---|
| 2,614,058 | 10/1952 | Francis | 156—171 |
| 2,597,858 | 5/1952 | Freedlander | 29—132 XR |
| 2,943,009 | 6/1960 | Mirsky et al. | 156—153 |
| 2,804,678 | 9/1957 | Rockoff | 29—130 XR |
| 3,042,995 | 7/1962 | Birkin | 29—132 XR |
| 3,424,647 | 1/1969 | Callahan et al. | 161—205 XR |
| 2,706,166 | 4/1955 | Gurney | 117—75 XR |
| 3,366,514 | 1/1968 | Chadha et al. | 117—75 XR |

FOREIGN PATENTS 579,355  7/1946  Great Britain.

PHILIP DIER, Primary Examiner

U.S. Cl. X.R.

29—132; 117—75, 79; 138—145, 146; 156—187, 310, 323; 161—214

REEXAMINATION CERTIFICATE (960th)
United States Patent [19]

McGaughey

[11] B1 3,520,747

[45] Certificate Issued  Dec. 13, 1988

[54] METHOD OF MAKING STRUCTURAL MEMBERS OF LAYERS OF CORROSION RESISTANT COATINGS AND FIBROUS MATERIAL

[75] Inventor: Robert S. McGaughey, Indiana, Pa.

[73] Assignee: McCreary Tire & Rubber Company, Indiana, Pa.

Reexamination Request:
No. 90/001,082, Sep. 5, 1986

Reexamination Certificate for:
Patent No.: 3,520,747
Issued: Jul. 14, 1970
Appl. No.: 505,621
Filed: Oct. 29, 1965

[51] Int. Cl.$^4$ .................................. B32B 27/12
[52] U.S. Cl. ............................ 156/153; 29/130; 29/132; 138/145; 138/146; 156/187; 156/310; 156/323; 427/409; 427/413; 428/142; 428/251; 428/252; 428/302; 428/383; 428/392; 428/394
[58] Field of Search .................... 29/130, 132; 156/153

[56] References Cited

U.S. PATENT DOCUMENTS

| | | |
|---|---|---|
| 2,589 | 4/1842 | Creasey . |
| 4,244 | 10/1845 | Urny . |
| 59,580 | 11/1866 | Forsyth . |
| 387,647 | 8/1888 | Lang . |
| 989,845 | 4/1911 | Harding . |
| 1,236,317 | 8/1917 | Kempshall . |
| 1,528,956 | 3/1925 | Smith . |
| 1,820,338 | 4/1930 | Youngchild et al. . |
| 1,996,741 | 4/1935 | Benge . |
| 2,120,875 | 6/1938 | Tatnall . |
| 2,152,612 | 3/1939 | Tischer . |
| 2,157,440 | 5/1939 | Streckfus et al. . |
| 2,178,421 | 10/1939 | Freedlander . |
| 2,272,532 | 2/1942 | Shriver . |
| 2,312,853 | 3/1943 | Toland et al. . |
| 2,343,551 | 3/1944 | Harkins . |
| 2,369,635 | 2/1945 | Bacon . |
| 2,597,858 | 5/1952 | Freedlander . |
| 2,614,058 | 10/1952 | Francis . |
| 2,625,499 | 1/1953 | Nebesar . |
| 2,625,735 | 1/1953 | Hitov . |
| 2,653,887 | 9/1953 | Slayter . |
| 2,699,402 | 1/1955 | Meyer . |
| 2,706,166 | 4/1955 | Gurney . |
| 2,723,075 | 11/1955 | Collins . |
| 2,760,549 | 8/1956 | Nash et al. . |
| 2,792,324 | 5/1957 | Daley et al. . |
| 2,801,189 | 7/1957 | Collier . |
| 2,804,678 | 9/1957 | Rockoff . |
| 2,814,313 | 11/1957 | Tate . |
| 2,815,043 | 12/1957 | Kleiner et al. . |
| 2,824,033 | 2/1958 | Donaldson . |
| 2,866,731 | 12/1958 | VanEpp . |
| 2,900,292 | 8/1959 | Coleman, Jr. et al. . |
| 2,943,009 | 6/1960 | Mirsky et al. . |
| 2,961,362 | 11/1960 | Landes . |
| 2,976,202 | 3/1961 | Salem et al. . |
| 2,992,939 | 7/1961 | Larson et al. . |
| 3,002,866 | 10/1961 | Gartrell et al. . |
| 3,012,585 | 12/1961 | O'Brien, Jr. . |
| 3,032,460 | 5/1962 | Chipman et al. . |
| 3,042,545 | 7/1962 | Kienle et al. . |
| 3,080,893 | 3/1963 | Craycraft . |
| 3,091,173 | 5/1963 | Koch . |
| 3,147,698 | 9/1964 | Ross . |
| 3,184,355 | 5/1965 | Brown . |
| 3,193,437 | 7/1965 | Schafer . |
| 3,293,728 | 12/1966 | Hill . |
| 3,352,955 | 11/1967 | Pigott et al. . |
| 3,366,514 | 1/1968 | Chadha et al. . |
| 3,423,264 | 1/1969 | Miron et al. . |
| 3,424,647 | 1/1969 | Callahan et al. . |
| 3,447,572 | 6/1969 | Vanderbilt et al. . |
| 3,451,112 | 6/1969 | Karmell et al. . |
| 3,490,119 | 1/1970 | Fukuyama et al. . |

FOREIGN PATENT DOCUMENTS

| | | |
|---|---|---|
| 216331 | 12/1960 | Australia . |
| 550800 | 4/1932 | Fed. Rep. of Germany . |
| 829354 | 12/1951 | Fed. Rep. of Germany . |
| 889424 | 7/1953 | Fed. Rep. of Germany . |
| 970339 | 8/1958 | Fed. Rep. of Germany . |
| 1069040 | 11/1959 | Fed. Rep. of Germany . |
| 1141437 | 12/1962 | Fed. Rep. of Germany . |
| 1914133 | 4/1965 | Fed. Rep. of Germany . |
| 1229548 | 12/1966 | Fed. Rep. of Germany . |
| 1807331 | 6/1970 | Fed. Rep. of Germany . |
| 1197035 | 6/1959 | France . |
| 1274842 | 9/1961 | France . |
| 1278030 | 10/1961 | France . |
| 1297969 | 5/1962 | France . |
| 9621 | 8/1951 | Japan . |
| 4285 | 5/1959 | Japan . |
| 1678 | of 1969 | Sweden . |
| 468400 | 7/1937 | United Kingdom . |
| 470932 | 8/1937 | United Kingdom . |
| 470956 | 8/1937 | United Kingdom . |
| 586626 | 4/1947 | United Kingdom . |
| 649687 | 1/1951 | United Kingdom . |
| 762453 | 11/1956 | United Kingdom . |
| 804667 | 11/1958 | United Kingdom . |
| 823577 | 11/1959 | United Kingdom . |
| 851715 | 10/1960 | United Kingdom . |
| 895420 | 5/1962 | United Kingdom . |
| 927716 | 6/1963 | United Kingdom . |
| 964375 | 7/1964 | United Kingdom . |
| 1013039 | 12/1965 | United Kingdom . |
| 1046584 | 10/1966 | United Kingdom . |
| 1118447 | 7/1968 | United Kingdom . |

OTHER PUBLICATIONS

Handbook of Reinforced Plastics, Society of the Plastics Industry, Inc., Oleesky et al, pp. 74–75.

"Evaluating Performance of Fiber Glass Laminates", Cass et al, Industrial and Engineering Chemistry, vol. 56, 08/64 pp. 30–34.

Handbook of Thermoplastic Elastomers, Walker (VanNostrand Reinhold Company 1980) p. vii.

Plastic Boat Building, Arkhangel SKII, (MacMillan Company 1964) pp. 54–59.

Handbook of Reinforced Plastics-SPI, Oleesky et al, (VanNostrand Reinhold Company 1964), pp. 399–402.

"Rubber-to-Metal Adhesion", Stout, Rubber Age, Mar. 1960, pp. 1025-1027.
Glass Fibre Reinforced Plastics, Dani (Goerge Newnes Limited 1960), pp. 103-104.
The Chemistry of Commercial Plastics, Wakeman, R. L., (Reinhold Publishing Corp. 1947) pp. 554-555.
Fiberglass Reinforced Plastics, Sonneborn (Reinhold Publishing Corp. 1954) pp. 66-67.

*Primary Examiner*—Mark Rosenbaum

[57] ABSTRACT

I disclose a process for making a structural member for use in hydrofluoric and other corrosive environments, said structural member including a base structure, said process including the steps of roughening said base structure, applying a coating to said roughened surface of resin selected from the group consisting of polyester, phenolic and epoxy resins, depositing a layer of fiber glass material on said resin, coating an additional quantity of said resin on said fiber glass material, said additional resin being worked into the interstices of said fiber glass material to impregnate said fiber glass material as well as to leave a coating of said resin material thereover, applying a layer of fibrous material selected from the group consisting of crocidilite, asbestos, and fibrous polyvinyl chloride-acrylonitrile copolymer to said second-mentioned resin coating, applying a third quantity of said resin to the surface of said fibrous material, said third quantity of resin being worked into the interstices of said fibrous material to impregnate said material and to leave a coating of said resin thereover.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 6–8 and 10 is confirmed.

Claims 1-5, 9, and 11-20 are cancelled.

* * * * *